United States Patent
Romem et al.

(10) Patent No.: US 10,649,950 B2
(45) Date of Patent: May 12, 2020

(54) DISK ACCESS OPERATION RECOVERY TECHNIQUES

(71) Applicant: Excelero Storage Ltd., Tel Aviv (IL)

(72) Inventors: Yaniv Romem, Jerusalem (IL); Ofer Oshri, Kfar Saba (IL); Omri Mann, Jerusalem (IL)

(73) Assignee: Excelero Storage Ltd., Tel Aviv (IL)

( * ) Notice: Subject to any disclaimer, the term of this patent is extended or adjusted under 35 U.S.C. 154(b) by 203 days.

(21) Appl. No.: 15/684,422

(22) Filed: Aug. 23, 2017

(65) Prior Publication Data

US 2018/0060273 A1 Mar. 1, 2018

Related U.S. Application Data

(60) Provisional application No. 62/381,005, filed on Aug. 29, 2016.

(51) Int. Cl.
| | |
|---|---|
| *G06F 15/167* | (2006.01) |
| *G06F 15/173* | (2006.01) |
| *H04L 29/06* | (2006.01) |
| *G06F 3/06* | (2006.01) |
| *H04L 29/08* | (2006.01) |
| *G06F 11/20* | (2006.01) |

(52) U.S. Cl.
CPC .......... *G06F 15/167* (2013.01); *G06F 3/067* (2013.01); *G06F 3/0617* (2013.01); *G06F 3/0635* (2013.01); *G06F 3/0689* (2013.01); *G06F 15/17331* (2013.01); *H04L 67/1097* (2013.01); *H04L 67/42* (2013.01); *G06F 11/2094* (2013.01)

(58) Field of Classification Search
CPC ............. G06F 15/167; G06F 15/17331; G06F 3/0482; G06F 3/0617; G06F 3/0689; G06F 3/067; G06F 11/00; H04L 67/42; H04L 67/1097; H04L 41/0654; H04L 45/24; H04L 47/6295
USPC ......................................................... 709/212
See application file for complete search history.

(56) References Cited

U.S. PATENT DOCUMENTS

| | | |
|---|---|---|
| 5,717,691 A | 2/1998 | Dighe et al. |
| 6,839,803 B1 | 1/2005 | Loh et al. |
| 7,515,612 B1 | 4/2009 | Thompson |
| 7,539,780 B2 | 5/2009 | Makhervaks et al. |
| 7,577,667 B2 | 8/2009 | Hinshaw et al. |
| 7,590,768 B2 | 9/2009 | Gormley |

(Continued)

*Primary Examiner* — Ruolei Zong
(74) *Attorney, Agent, or Firm* — M&B IP Analysts, LLC

(57) ABSTRACT

A system and method for providing remote direct memory access failover. The method includes receiving, at a storage server including a network storage device, an access instruction over a first communication path between a client device and the storage server, wherein the network storage device includes a first memory and a second memory, wherein the first memory stores a first access queue; storing the access instruction in the first access queue; storing a second access queue in the second memory when the first communication path has failed, wherein the second access queue is at least a portion of the first access queue including the access instruction; determining a status of the access instruction when a second communication path is established with the client device; and sending, to the client device, a notification indicating the determined status of the access instruction via the second communication path.

19 Claims, 4 Drawing Sheets

(56) References Cited

U.S. PATENT DOCUMENTS

| | | |
|---|---|---|
| 7,710,968 B2 | 5/2010 | Cornett et al. |
| 8,037,154 B2 | 10/2011 | Biran et al. |
| 8,103,785 B2 | 1/2012 | Crowley et al. |
| 8,122,155 B1 | 2/2012 | Marti |
| 8,233,380 B2 | 7/2012 | Subramanian et al. |
| 8,265,095 B2 | 9/2012 | Fritz et al. |
| 8,407,448 B1 | 3/2013 | Hayden et al. |
| 8,433,848 B1 | 4/2013 | Naamad et al. |
| 8,706,962 B2 | 4/2014 | Belluomini et al. |
| 8,775,718 B2 | 7/2014 | Kanevsky et al. |
| 8,832,216 B2 | 9/2014 | Bugge |
| 9,241,044 B2 | 1/2016 | Shribman et al. |
| 9,462,308 B2 | 10/2016 | LaBosco et al. |
| 2004/0199808 A1* | 10/2004 | Freimuth .......... H04B 1/74 714/4.11 |
| 2005/0129039 A1 | 6/2005 | Biran et al. |
| 2006/0045005 A1* | 3/2006 | Blackmore .......... H04L 1/0079 370/216 |
| 2006/0045108 A1* | 3/2006 | Blackmore .......... H04L 67/1097 370/402 |
| 2006/0059282 A1* | 3/2006 | Chaudhary .......... H04L 67/1097 710/100 |
| 2006/0075067 A1* | 4/2006 | Blackmore .......... H04L 69/16 709/217 |
| 2012/0144233 A1 | 6/2012 | Griffith et al. |
| 2012/0166886 A1* | 6/2012 | Shankar .......... G06F 11/2028 714/43 |
| 2013/0198311 A1 | 8/2013 | Tamir et al. |
| 2013/0198312 A1 | 8/2013 | Tamir et al. |
| 2014/0089444 A1 | 3/2014 | Makhervaks et al. |
| 2014/0136880 A1* | 5/2014 | Shankar .......... G06F 11/2028 714/4.11 |
| 2014/0297982 A1 | 10/2014 | Duzett |
| 2015/0026286 A1 | 1/2015 | Sharp et al. |
| 2015/0089121 A1 | 3/2015 | Coudhury et al. |

* cited by examiner

DISK ACCESS OPERATION RECOVERY TECHNIQUES

CROSS-REFERENCE TO RELATED APPLICATIONS

This application claims the benefit of U.S. Provisional Application No. 62/381,005 filed on Aug. 29, 2016, the contents of which are hereby incorporated by reference.

TECHNICAL FIELD

The present disclosure relates generally to redundancy in storage devices, and more particularly to network accessible storage devices providing data redundancy and high transactionality.

BACKGROUND

Modern network storage devices allow implementation of storage virtualization in new ways, creating opportunities for ACID properties of the storage server. However, each attribute which allows redundancy, such as use of multiple communication paths and use of multiple storage devices, presents a new set of problems when failures occur.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for providing remote direct memory access failover. The method comprises receiving, at a storage server including a network storage device, an access instruction over a first communication path between a client device and the storage server, wherein the network storage device includes a first memory and a second memory, wherein the first memory stores a first access queue; storing the access instruction in the first access queue; storing a second access queue in the second memory when the first communication path has failed, wherein the second access queue is at least a portion of the first access queue including the access instruction; determining a status of the access instruction when a second communication path is established with the client device; and sending, to the client device, a notification indicating the determined status of the access instruction via the second communication path.

Certain embodiments disclosed herein also include a non-transitory computer readable medium having stored thereon causing a processing circuitry to execute a process for providing remote direct memory access failover, the process comprising: receiving, at a storage server including a network storage device, an access instruction over a first communication path between a client device and the storage server, wherein the network storage device includes a first memory and a second memory, wherein the first memory stores a first access queue; storing the access instruction in the first access queue; storing a second access queue in the second memory when the first communication path has failed, wherein the second access queue is at least a portion of the first access queue including the access instruction; determining a status of the access instruction when a second communication path is established with the client device; and sending, to the client device, a notification indicating the determined status of the access instruction via the second communication path.

Certain embodiments disclosed herein also include a system for providing remote direct memory access failover. The system comprises: a processing circuitry; and a memory, the memory containing instructions that, when executed by the processing circuitry, configure the system to: receive, at a storage server including a network storage device, an access instruction over a first communication path between a client device and the storage server, wherein the network storage device includes a first memory and a second memory, wherein the first memory stores a first access queue; store the access instruction in the first access queue; store a second access queue in the second memory when the first communication path has failed, wherein the second access queue is at least a portion of the first access queue including the access instruction; determine a status of the access instruction when a second communication path is established with the client device; and send, to the client device, a notification indicating the determined status of the access instruction via the second communication path.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
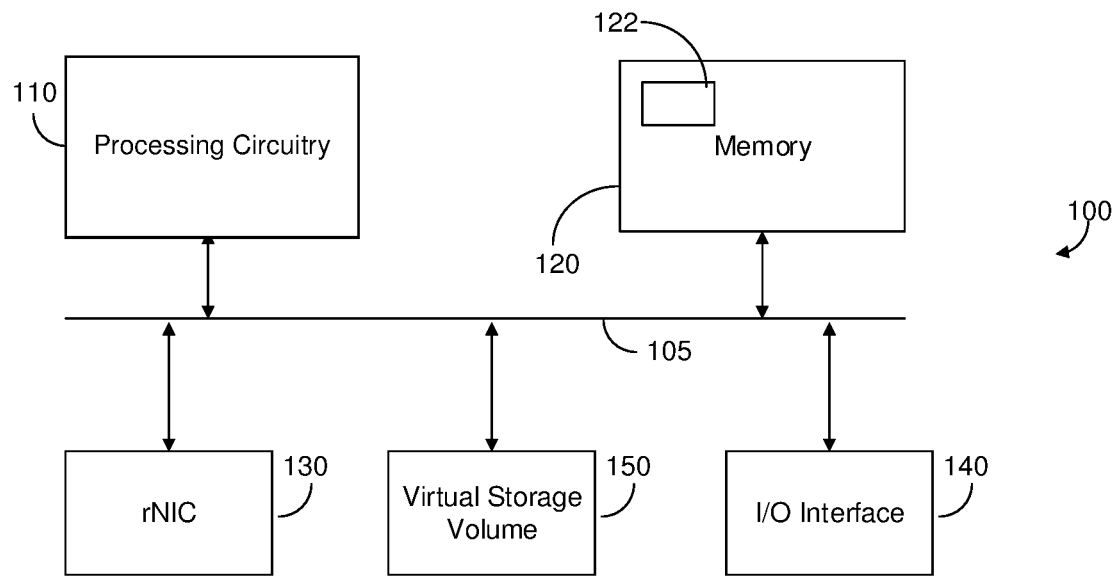
FIG. 1 is a schematic diagram of a client device.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for providing failover for remote storages. An access instruction is received from a client device over a first communication path at a storage server hosting a network storage device storing an access queue. The access queue may include an input/output (I/O) submission queue, an I/O completion queue, or both. Upon a failure in the first communication path, at least a portion of the access queue is stored in a secondary memory of the storage server. A second communication path is established between the client device and the network storage device. A status of the access instruction is determined.

FIG. 1 is an example schematic diagram of a client device 100 configured for access to a remote storage server. The client device 100 includes a processing circuitry 110 coupled to a memory 120, a remote network interface card (rNIC) 130, an input/output (I/O) Interface 140, and a virtual storage volume 150. The components of the client device 100 may be communicatively connected via a bus 105. In an embodiment, the client device 100 is configured for remote direct memory access (RDMA) to the storage server 200, FIG. 2.

In an embodiment, the processing circuitry 110 is configured to perform RDMA to the remote storage server. To this end, the rNIC 130 is configured to provide network access, thereby allowing for sending and receiving of data over a network (not shown). The rNIC 130 may include multiple communication ports for communicating with storage devices (not shown). The I/O interface 140 may allow for receiving inputs via an input device such as, but not limited to, a mouse, a keyboard, a touchscreen, and the like; and for sending outputs via an output device such as, but not limited to, a display, a printer, and the like.

The virtual storage volume 150 includes virtual address blocks, where each virtual address block corresponds to a physical address block. The corresponding physical address blocks may be included in one or more storage devices (not shown) accessed using the rNIC 130. Each storage device may be included in or otherwise connected to a different storage server. In some implementations, the virtual storage volume 150 may correspond to a single physical remote storage device.

The processing circuitry 110 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 120 may be volatile (e.g., RAM, etc.), non-volatile (e.g., ROM, flash memory, etc.), or a combination thereof. The memory 120 may include a memory portion 122 configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 110 to generate and send XOR products to be utilized for reduced bandwidth remote storage as described herein. The memory 120 may also be used as a working scratch pad for the processing circuitry 110, a temporary storage, and the like.

Figure 2:
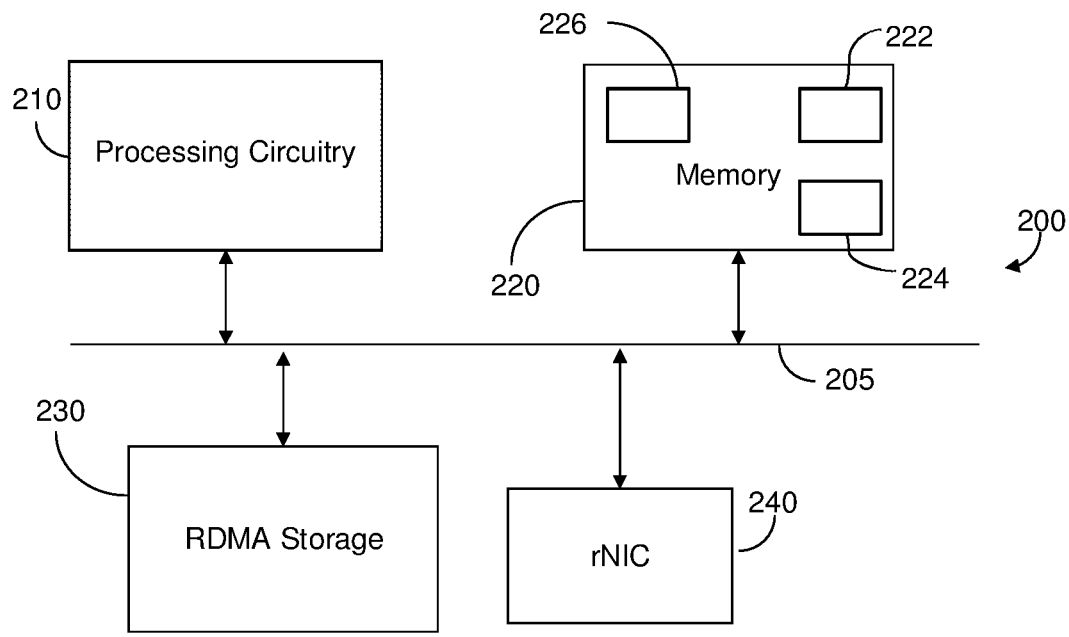
FIG. 2 is a schematic diagram of a storage server for providing access to a data redundant storage device according to an embodiment.

FIG. 2 is an example schematic diagram of a storage server 200 for providing reduced bandwidth remote storage according to an embodiment. The storage server 200 includes a processing circuitry 210 coupled to a memory 220, a remote direct memory access (RDMA) storage 230, and a remote network interface card (rNIC) 240. The components of the storage server 200 may be communicatively connected via a bus 205.

In an embodiment, the processing circuitry 210 is configured to provide reduced bandwidth remote storage in accordance with the disclosed embodiments. The remote storage may include storing data in the RDMA storage 230. To this end, the rNIC 240 is configured to provide network access, thereby allowing for sending and receiving of data over a network (not shown). The rNIC 240 may be an RDMA-enabled NIC.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In an example implementation, the memory 220 includes a first memory portion 222 and a second memory portion 224. The first memory portion may store, but is not limited to, an access queue. When a communication path used for receiving access instructions and sending responses to access instructions by a client device fails, the secondary memory portion may store the contents of the access queue.

The memory 220 may also include a third memory portion 226 configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to perform the embodiments described herein. The memory 220 may also be used as a working scratch pad for the processing circuitry 210, a temporary storage, and the like.

Figure 3:
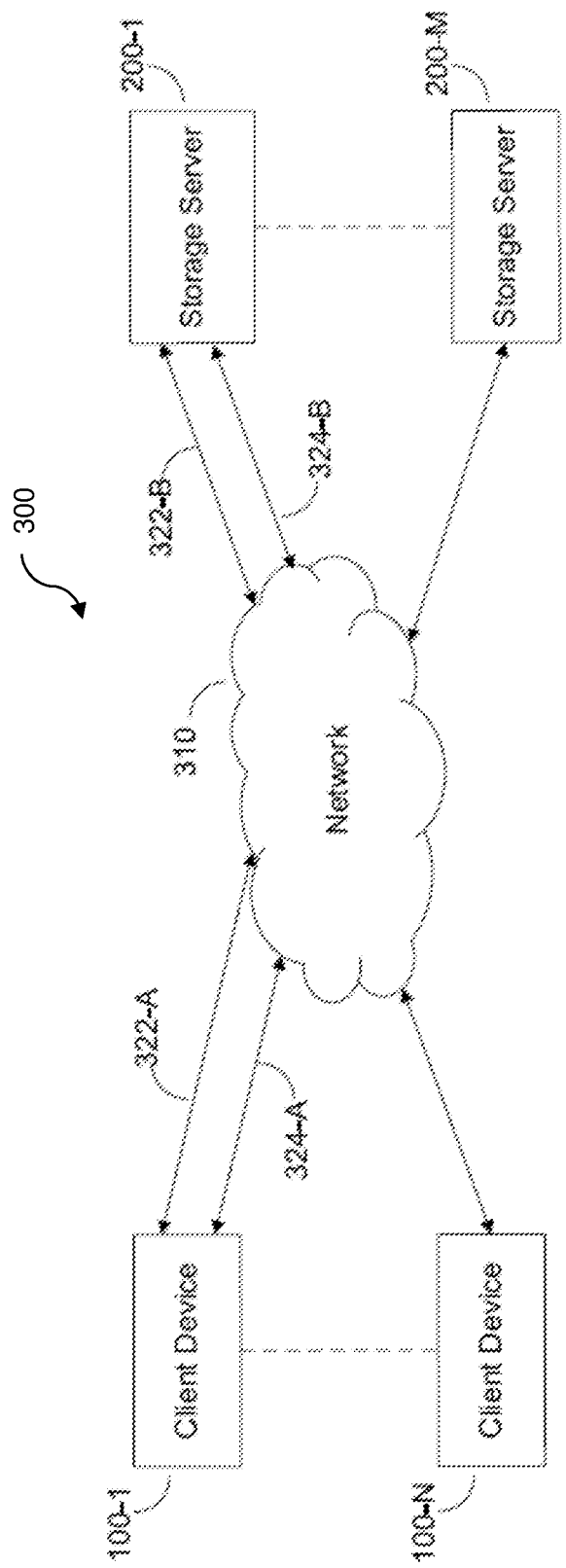
FIG. 3 is a network diagram utilized to describe various disclosed embodiments.

FIG. 3 is an example network diagram 300 utilized to described various disclosed embodiments. The network diagram 300 includes client device 100-1 through 100-N (hereinafter referred to individually as a client device 100 and collectively as client device 100, merely for simplicity purposes) communicatively connected to a plurality of storage servers 200-1 through 200-M (hereinafter referred to individually as a storage server 200 and collectively as storage servers 200, merely for simplicity purposes) via a network 310. Each of 'N' and 'M' is a natural number having a value of 1 or greater. The network 310 may be, but is not limited to, a wireless, cellular or wired network, a local area network (LAN), a wide area network (WAN), a metro area network (MAN), the Internet, the worldwide web (WWW), similar networks, and any combination thereof.

In an example implementation, the client device 100 may be configured as the client device 100 described herein above with respect to FIG. 1 and the storage server 200 may be configured as the storage server 200 described herein above with respect to FIG. 2. Each of the client devices 100 may be configured to communicate with any of the storage servers 200 via, for example, remote direct memory access (RDMA) protocols. Each of the storage servers 200 includes a storage device (not shown) such as the RDMA storage 230, FIG. 2.

In the example network diagram 300, the client device 100-1 is communicatively connected to the storage server 200-1 via a first communication path 322 and a second communication path 324. Each of the first communication path 322 and the second communication path 324 includes a first portion 322-A or 324-A between the client device 100-1 and the network 310, and a second portion 322-B or 324-B between the network 310 and the storage server 200-1. In some implementations, each communication path 322 and 324 may be established with a distinct server.

In some implementations, more than two communication paths may be used. Using multiple communication paths allows for both high availability and redundancy. The high availability and redundancy may, in turn, allow for implementation of, for example, RAID5, RAID6, and RAID10.

Figure 4:
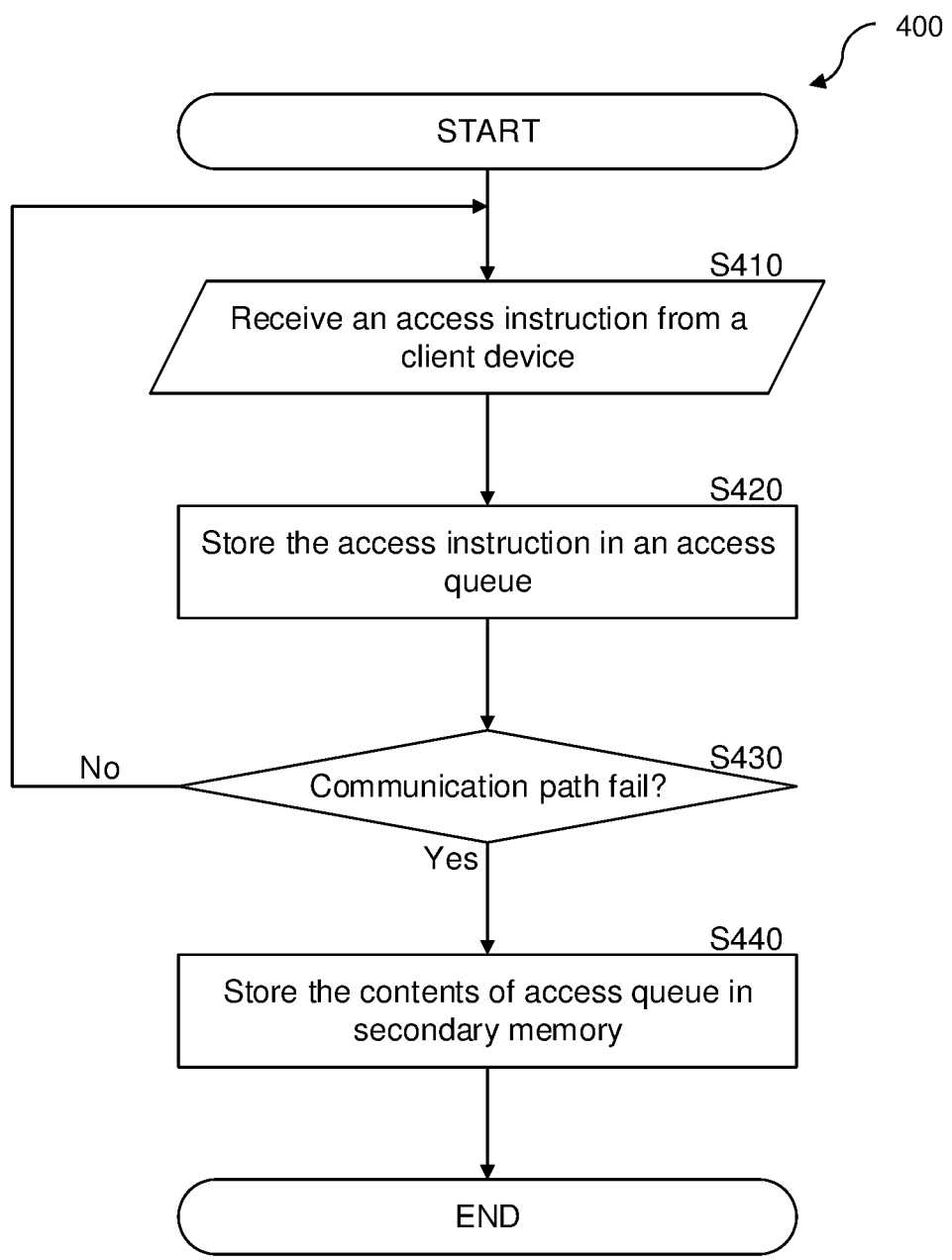
FIG. 4 is a flowchart illustrating a method for improving failover according to an embodiment.

FIG. 4 is an example flowchart 400 illustrating a method for improving failover on a storage server including a storage device according to an embodiment. The storage device may be a RDMA storage device. In an embodiment, the method may be performed by the storage server 200-1.

At S410, an access instruction is received from a client device over a communication path. The access instruction may be to perform an access operation such as, but not limited to, read, write, trim, and the like. The access instruction may include, but is not limited to, a block address, data to be written, both, and the like.

At S420, the access instruction is stored in an access queue. The access queue may be implemented in a memory such as, for example, the memory 220. In an example implementation, the access queue is stored in a primary memory portion such as the first memory portion 222.

In an example implementation, the access queue may include, but is not limited to, an I/O submission queue, an I/O completion queue, one or more doorbell registers, a combination thereof, and the like. The access queue may be implemented using, for example, non-volatile memory express (NVMe). In an embodiment, the access queue is implemented as a fixed size circular buffer. The I/O submission queue may store access instructions to be performed. A response to an access instruction may be stored in the I/O completion queue, sent to the client device, or both. For example, once an access operation indicated in the access instruction is completed, a response is generated and stored in the I/O completion queue.

Each queue may include one or more doorbell registers, each of which may be updated for each access instruction or response. An I/O submission queue tail doorbell register may be updated, for example, when a new access instruction is received.

In some implementations, a multi-core processor may be used, and I/O queues may be initiated on each core. Further, the cores may have different numbers of queues. For example, a first core may have a single I/O submission queue and a single I/O completion queue, while a second core may have multiple I/O submission queues and multiple I/O completion queues. As another example, the first core, second core, or both, may have multiple I/O submission queues and a single I/O completion queue.

At S430, it is checked if the communication path with the client device has failed and, if so, execution continues with S440; otherwise, execution continues with S410 when the next access instruction is received from the client device. In an example implementation, a rNIC of the storage server may indicate that the communication path has failed.

Failure of a communication path may result in loss of transactionality. For example, a client device sending a write instruction to a storage server may not distinguish between a first scenario where a write instruction was successfully received and performed by the storage server but the communication path failed before the response could be sent, and a second scenario where the storage server did not receive the write instruction due to the communication path failure. In both scenarios, the client device does not receive confirmation, but there is no way to know if the access instruction was performed or not.

At S440, when the communication path has failed, the contents of the access queue are stored in a secondary memory of the storage server. The contents of the access queue may be stored as a snapshot, which reflects the state of the access queue at the point of failure of the communication path. The access queue of the primary memory may continue to receive access instructions. Consequently, the access queue contents stored in the secondary memory may be utilized to subsequently determine a status of access instructions received once communications with the client device have resumed (for example, when the communication path is reestablished or another communication path is established) while allowing for continuing modification of the access queue stored in the primary memory.

The contents of the access queue stored in the secondary memory may be stored, for example, for a predetermined period of time, for a dynamically determined period of time, or in perpetuity until, for example, all access instructions of the access queue are confirmed to have been performed. Different portions of the stored contents may be stored in the secondary memory for different periods of time. For example, an I/O submission queue may be stored dynamically, an I/O completion queue may be stored in perpetuity, and each doorbell register may be stored for a predetermined period of time.

In an example implementation, the secondary memory may be a secondary memory portion (e.g., the second memory portion 224, FIG. 2) of a memory, such that the contents of a primary access queue stored in a primary memory portion (e.g., the first memory portion 222, FIG. 2) of the memory are stored in the secondary memory portion when the communication path fails. In other implementations, the primary memory and the secondary memory may be separate memories.

Figure 5:
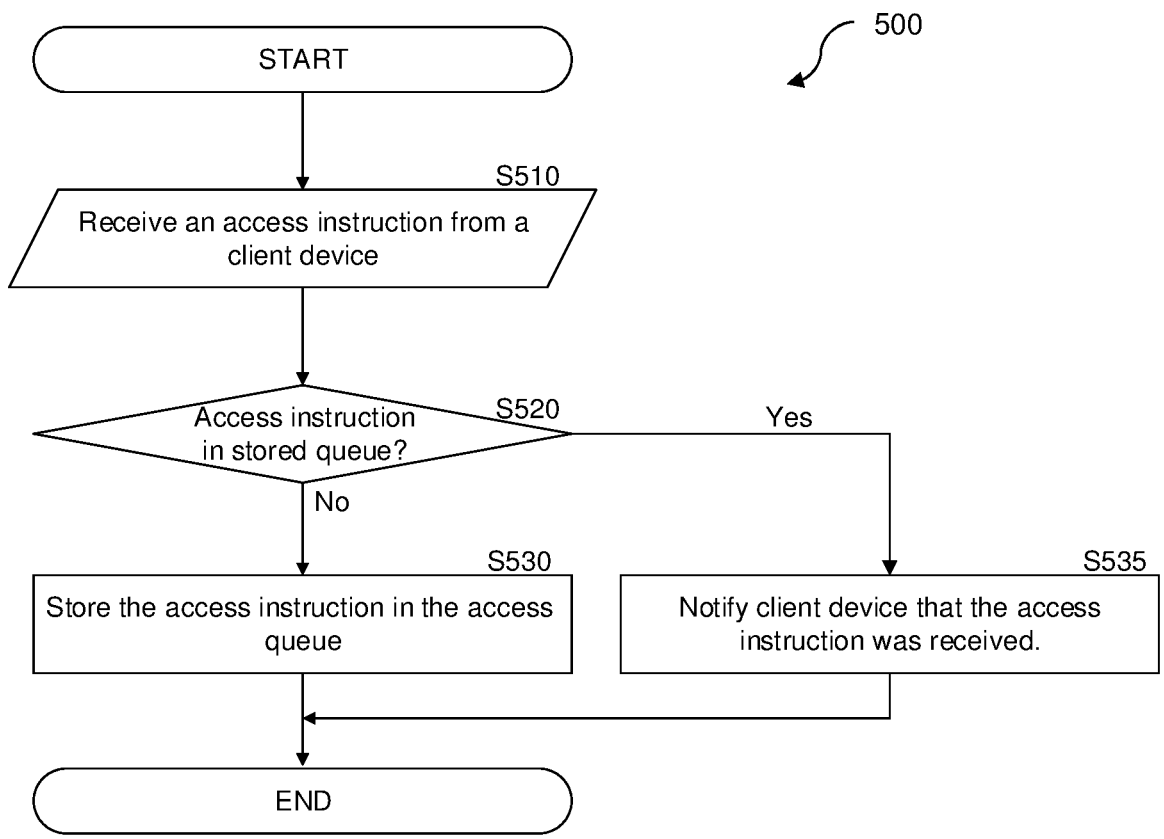
FIG. 5 is a flowchart illustrating a method for recovering from a communication path failure according to an embodiment.

FIG. 5 is an example flowchart 500 illustrating a method for recovering from a communication path failure between a client device and a storage server according to an embodiment. In an embodiment, the method may be performed by the storage server 200-1. The At S510, an access instruction is received from a client device. As a non-limiting example, the access instruction may be received from the client device 100-1 through the network 310 via the first communication path 322 as shown in FIG. 3. The access instruction may be, but is not limited to, read, write, trim, and the like. The access instruction may include, but is not limited to, a block address, data to be written, both, and the like. The access instruction may be received over a first communication path, a second communication path that is distinct from the first communication path, a reestablished communication path, and the like.

At S520, it is checked if the received access instruction is stored as contents of an access queue in a secondary memory and, if so, execution continues with S540; otherwise, execution continues with S530. The secondary memory may store contents of an access queue in a primary memory as described further herein above with respect to FIG. 4. For example, it may be checked if the access instruction is included in a snapshot of the access queue stored in the secondary memory. In some implementations, the check is not made and execution may continue with S530 when the secondary memory does not store contents of an access queue. In other implementations, it may be checked whether the secondary memory stores any content of an access queue and, if not, it is determined that the access instruction is not stored in the secondary memory and execution may continue with S530.

At S530, when at least the access instruction is not stored in the secondary memory, the access instruction is stored in the access queue and execution terminates. Storing access instructions in the access queue when the access instructions are not in the secondary memory allows for ensuring that only access instructions which have not yet been performed are added to the access queue, thereby preventing repeated performance of access operations for the same access instructions.

At S540, when the access instruction is stored in the secondary memory, a notification is sent to the client device that sent the access instruction. In an example implementation, the notification indicates at least that the access instruction was received, and may further indicate that the access instruction was successfully executed. If the currently received access instruction is stored in the secondary memory, then the current access instruction is a second instance of the access instruction that was previously successfully received.

In an embodiment, S540 may further include determining whether the access instruction is stored in an access queue in the primary memory and, if so, operation continues normally, as the access instruction been received but has not yet been processed; otherwise, one or more corrective actions may be performed. The corrective actions may include, but are not limited to, re-performing the received access instruction, generating and sending a notification regarding the received access instruction, both, and the like. For example, if the access instruction is "read" and indicates a block address, the access instruction may be performed again and a response including data from the block address is provided to the client device since the client device may not have received the contents of the response.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; A and B in combination; B and C in combination; A and C in combination; or A, B, and C in combination.

What is claimed is:

1. A method for providing remote direct memory access failover, comprising:
   receiving, at a storage server including a network storage device, an access instruction over a first communication path between a client device and the storage server, wherein the network storage device includes a first memory and a second memory, wherein the first memory stores a first access queue;
   storing the access instruction in the first access queue;
   storing a second access queue in the second memory when the first communication path has failed, wherein the second access queue is at least a portion of the first access queue including the access instruction, wherein the second access queue is a snapshot of the first access queue, wherein the snapshot reflects the state of the first access queue at a point of failure of the first communication path;
   determining, based on the snapshot reflecting the state of the first access queue at the point of failure of the first communication path, a status of the access instruction when a second communication path is established with the client device; and
   sending, to the client device, a notification indicating the determined status of the access instruction via the second communication path.

2. The method of claim 1, wherein the first access queue includes at least one of: at least one input/output (I/O) submission queue, and at least one I/O completion queue.

3. The method of claim 2, wherein determining the status of the access instruction further comprises:
determining whether the I/O submission queue stores the access instruction.

4. The method of claim 2, wherein determining the status of the access instruction further comprises:
determining whether the I/O completion queue stores a completion status of the access instruction, wherein the determined status is the completion status when the I/O completion queue stores the completion status.

5. The method of claim 1, wherein the second access queue is stored in the second memory for any of: a predetermined period of time, and a dynamically determined period of time.

6. The method of claim 1, wherein determining the status of the access instruction further comprises:
receiving a new access instruction; and
comparing the new access instruction to access instructions stored in the second access queue to determine whether the new access instruction is stored in the second access queue, wherein the determined status at least indicates that the access instruction was successfully received when the new access instruction is stored in the second access queue.

7. The method of claim 6, further comprising:
storing the access instruction in the first access queue when the new access instruction is not stored in the second access queue.

8. The method of claim 1, wherein the second communication path is between the client device and a different storage server.

9. The method of claim 1, wherein the second communication path is the first communication path when the first communication path is reestablished.

10. A non-transitory computer readable medium having stored thereon instructions for causing a processing circuitry to execute a process, the process comprising:
receiving, at a storage server including a network storage device, an access instruction over a first communication path between a client device and the storage server, wherein the network storage device includes a first memory and a second memory, wherein the first memory stores a first access queue;
storing the access instruction in the first access queue;
storing a second access queue in the second memory when the first communication path has failed, wherein the second access queue is at least a portion of the first access queue including the access instruction, wherein the second access queue is a snapshot of the first access queue, wherein the snapshot reflects the state of the first access queue at a point of failure of the first communication path;
determining, based on the snapshot reflecting the state of the first access queue at the point of failure of the first communication path, a status of the access instruction when a second communication path is established with the client device; and
sending, to the client device, a notification indicating the determined status of the access instruction via the second communication path.

11. A system for providing remote direct memory access failover, comprising:
a network storage device including a first memory and a second memory, wherein the first memory stores a first access queue;
a processing circuitry; and
a memory, the memory containing instructions that, when executed by the processing circuitry, configure the system to:
receive an access instruction over a first communication path between a client device and the system;
store the access instruction in the first access queue;
store a second access queue in the second memory when the first communication path has failed, wherein the second access queue is at least a portion of the first access queue including the access instruction, wherein the second access queue is a snapshot of the first access queue, wherein the snapshot reflects the state of the first access queue at a point of failure of the first communication path;
determine, based on the snapshot reflecting the state of the first access queue at the point of failure of the first communication path, a status of the access instruction when a second communication path is established with the client device; and
send, to the client device, a notification indicating the determined status of the access instruction via the second communication path.

12. The system of claim 11, wherein the first access queue includes at least one of: at least one input/output (I/O) submission queue, and at least one I/O completion queue.

13. The system of claim 12, wherein the system is further configured to:
determine whether the I/O submission queue stores the access instruction.

14. The system of claim 12, wherein the system is further configured to:
determine whether the I/O completion queue stores a completion status of the access instruction, wherein the determined status is the completion status when the I/O completion queue stores the completion status.

15. The system of claim 11, wherein the second access queue is stored in the second memory for any of: a predetermined period of time, and a dynamically determined period of time.

16. The system of claim 11, wherein the system is further configured to:
receive a new access instruction; and
compare the new access instruction to access instructions stored in the second access queue to determine whether the new access instruction is stored in the second access queue, wherein the determined status at least indicates that the access instruction was successfully received when the new access instruction is stored in the second access queue.

17. The system of claim 16, wherein the system is further configured to:
store the access instruction in the first access queue when the new access instruction is not stored in the second access queue.

18. The system of claim 11, wherein the second communication path is between the client device and a different storage server.

19. The system of claim 11, wherein the second communication path is the first communication path when the first communication path is reestablished.

* * * * *